(12) United States Patent
Kimura et al.

(10) Patent No.: US 8,243,958 B2
(45) Date of Patent: Aug. 14, 2012

(54) RECEIVER

(75) Inventors: Yuji Kimura, Ishikawa (JP); Yoshitaka Yoshino, Tokyo (JP); Koichi Mukai, Ishikawa (JP); Chisato Komori, Ishikawa (JP)

(73) Assignee: Sony Corporation, Tokyo (JP)

( * ) Notice: Subject to any disclaimer, the term of this patent is extended or adjusted under 35 U.S.C. 154(b) by 1596 days.

(21) Appl. No.: 11/599,354

(22) Filed: Nov. 15, 2006

(65) Prior Publication Data
US 2007/0127741 A1 Jun. 7, 2007

(30) Foreign Application Priority Data
Nov. 22, 2005 (JP) ................................. 2005-336477

(51) Int. Cl.
*H04R 3/00* (2006.01)
(52) U.S. Cl. ........ 381/111; 381/74; 455/569.1; 343/718
(58) Field of Classification Search .................. 381/74, 381/77, 79, 309, 311, 384, 111; 343/702, 343/718; 455/179.1, 188.1, 571.1, 569.1
See application file for complete search history.

(56) References Cited

U.S. PATENT DOCUMENTS

| | | | |
|---|---|---|---|
| 6,707,924 B1 * | 3/2004 | Okiebisu | 381/385 |
| 2005/0245289 A1 * | 11/2005 | Yoshino | 455/569.1 |
| 2006/0014560 A1 * | 1/2006 | Yoshino | 455/550.1 |
| 2006/0028383 A1 * | 2/2006 | Yoshino | 343/718 |
| 2006/0071869 A1 * | 4/2006 | Yoshino et al. | 343/718 |
| 2007/0032130 A1 * | 2/2007 | Yoshino | 439/578 |
| 2007/0105438 A1 * | 5/2007 | Yoshino | 439/578 |
| 2007/0171134 A1 * | 7/2007 | Yoshino et al. | 343/702 |

FOREIGN PATENT DOCUMENTS

| | | |
|---|---|---|
| GB | 2 360 182 | 9/2001 |
| GB | 2360182 A * | 9/2001 |
| JP | 2003-163529 | 6/2003 |
| JP | 2004-266434 | 9/2004 |
| JP | 2004-274356 | 9/2004 |
| JP | 2005-64742 | 3/2005 |

OTHER PUBLICATIONS

European Search Report; Application No./Patent No. 06124221.0-2411/1788712; Date: Nov. 4, 2008.

* cited by examiner

*Primary Examiner* — Vivian Chin
*Assistant Examiner* — Friedrich W Fahnert
(74) *Attorney, Agent, or Firm* — Rader Fishman & Grauer, PLLC (57) ABSTRACT

The present invention provides a receiver for making an earphone cord of an earphone function as an earphone antenna. The receiver includes a receiver circuit for receiving a broadcast wave signal received at the earphone code of the earphone and outputting an audio signal, an earphone jack into which a earphone plug is inserted, a first detector circuit for detecting whether the earphone is one of stereo and monaural functionalities, and a second detector circuit for the earphone is connected to the receiver. The earphone jack has an antenna terminal, left channel audio terminal and right channel audio terminal, a first detection terminal and a second detection terminal, and a ground terminal.

5 Claims, 5 Drawing Sheets

| TERMINAL | FUNCTION AND USE |
|---|---|
| A | FOR ANTENNA |
| B | N. C. |
| C | FOR EARPHONE TYPE DETECTION |
| D | FOR AUDIO RIGHT CHANNEL |
| E | FOR AUDIO LEFT CHANNEL |
| F | EARPHONE CONNECTION DETECTION |
| G | N. C. |
| H | N. C. |
| I | N. C. |
| J | GROUND |

RECEIVER

CROSS REFERENCES TO RELATED APPLICATIONS

The present invention contains subject matter related to Japanese Patent Application JP 2005-336477 filed in the Japanese Patent Office on Nov. 22, 2005, the entire contents of which being incorporated herein by reference.

BACKGROUND OF THE INVENTION

1. Field of the Invention

The present invention relates to a receiver and, more particularly, to earphones and a receiver configured to make a cord of earphones or headphones function also as an antenna.

2. Description of the Related Art

With portable FM receivers, a technology called an earphone antenna is known in which an earphone (or a headphone) cord is made function also as an antenna of each portable FM receiver. This technology makes it unnecessary for an FM broadcast listener to pull out a rod antenna of the listener's portable FM receiver. Therefore, each portable MF receiver user can listen to FM broadcasts in a crowded train, for example, without causing nuisance.

Terrestrial digital television broadcasting is hardly affected by ghost signals, so that a portable receiver can be configured or a mobile phone can incorporate a terrestrial digital television broadcast receiver circuit. In these examples, making the earphone code function also as the receiver antenna allows the simple and convenient viewing of television broadcasts.

Figure 3:
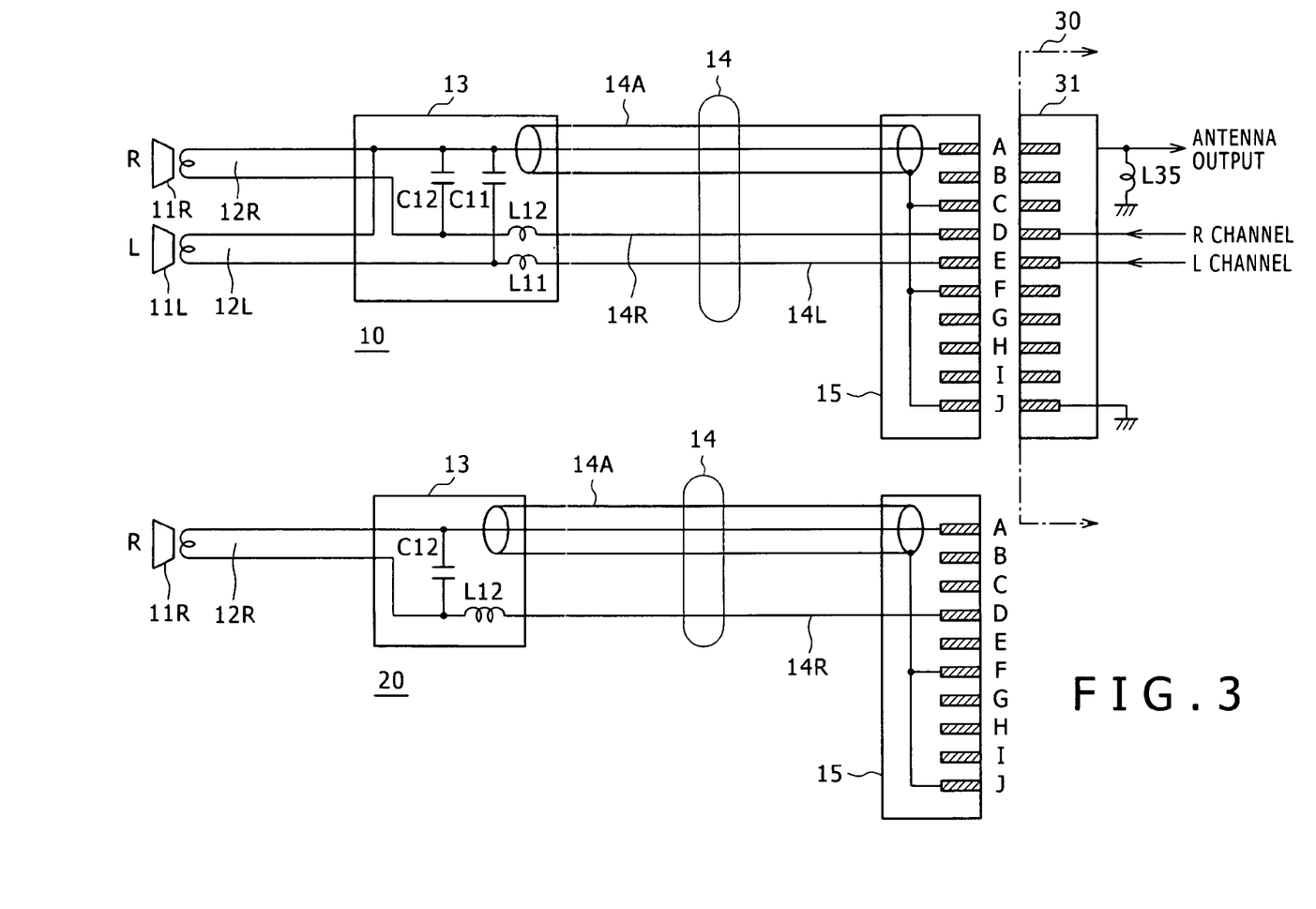
FIG. 3 is a connection diagram illustrating an earphone antenna.

If the earphone antenna is used on the mobile phone incorporating a terrestrial digital television broadcasting receiver circuit, the earphone antenna is configured as shown in FIG. 3, for example.

To be more specific, referring to FIG. 3, reference numeral 10 denotes stereo earphones, reference numeral 20 denotes monaural earphones, and reference numeral 30 denotes a mobile phone. Each earphone unit is connected to an earphone plug with a lead wire formed by a cord, an intermediate unit 13, and a cable 14. In the stereo earphones 10, a left-channel earphone unit (an electroacoustic transducer) 11L and a right-channel earphone unit (an electroacoustic transducer) 11R are connected to the intermediate unit 13 with cords 12L and 12R, respectively and the intermediate unit 13 is connected to an earphone plug 15 with a cable 14.

In this case, the cords 12L and 12R are each a two-core signal conductor. These cords 12L and 12R act as the effective part of the broadcast receiver antenna. The intermediate unit 13 has coupling capacitors C11 and C12 and high-frequency choke coils L11 and L12.

Further, the cable 14 is formed by combining a coaxial cable 14A and two cables 14L and 14R into a single cable. The earphone plug 15 has 10 terminals (or contacts) A through J. It should be noted that, as will be described later, the mobile phone 30 has an earphone jack 31 corresponding to the earphone plug 15. Terminals A through J of the earphone plug 15 and the earphone jack 31 are standardized and therefore common among manufacturers.

One ends of the earphone units 11L and 11R are lead to the intermediate unit 13 through the cord 12L or 12R to be commonly connected in the intermediate unit 13 and further connected to terminal A of the earphone plug 15 through the center conductor of the coaxial cable 14A. The other ends of the earphone units 11L and 11R are lead to the intermediate unit 13 through the cord 12L or 12R and is connected terminals D and E of the earphone plug 15, respectively, through the high-frequency choke coils L11 and L12 and the cables 14L and 14R.

Further, the capacitor C11 is connected to between one and the other of the codes 12L and the capacitor C12 is connected to between the one and the other of the codes 12R. In the earphone plug 15, the shield of the coaxial cable 14A is connected to terminal J to connect terminal F with terminal J and, because the earphones 10 is for stereo, terminal C with terminal J.

The monaural earphones 20 are also configured in substantially the same manner as the right channel of the stereo earphones 10. It should be noted that, in the earphone plug 15, terminal F is connected to terminal J, but terminal C and terminal J are not connected to each other because the monaural earphones 20 are for monaural use.

Figure 4:
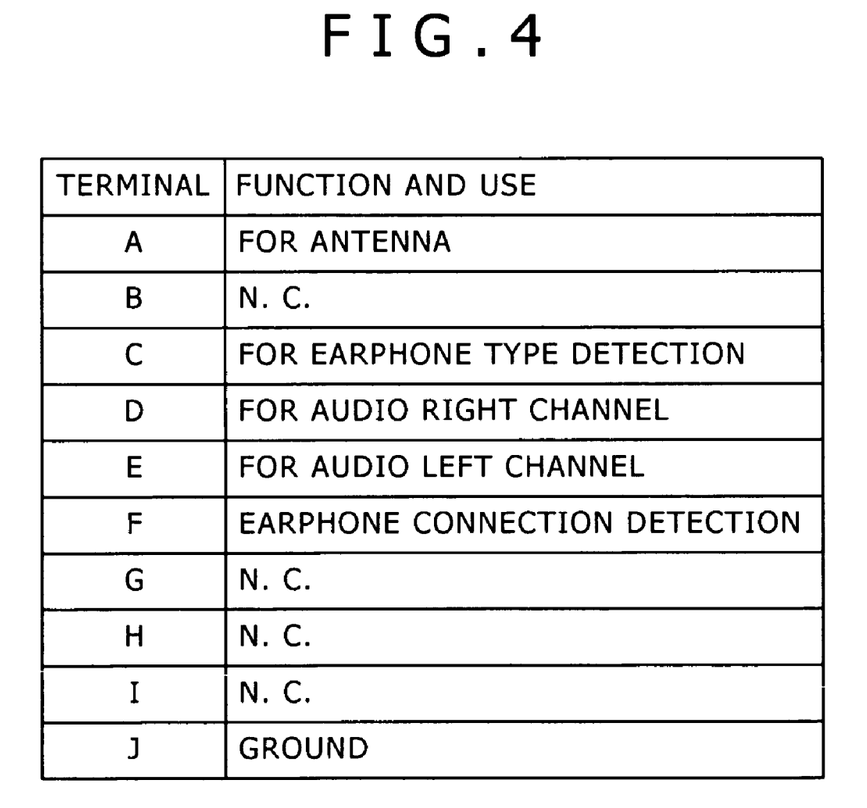
FIG. 4 is a diagram illustrating specifications of an earphone plug and a earphone jack.

As described above, the terminals A through J of the earphone plug 15 and the earphone jack 31 are standardized, the functions and uses thereof being specified as shown in FIG. 4.

To be more specific, of the terminals A through J of the earphone plug 15 and the earphone jack 31, terminal A is for the antenna and terminal C is for the detection whether the earphones are for stereo or monaural. Terminals D and E are for left and right channel audio signals. Terminal F is for the detection whether the earphone plug 15 is inserted into the earphone jack. Terminal J is for grounding. The remaining terminals B and G through I are reserved.

When the earphone plug 15 of the stereo earphones 10 is inserted in the earphone jack 31, the broadcast wave of FM broadcasting or terrestrial digital television broadcasting is received at the cord 12L and the cord 12R. The received broadcast wave signal is supplied to the mobile phone 30 along a signal line, from the cord 12L and cord 12R (or the cord 12L and the cord 12R to the capacitors C11 and C12), to the center conductor of the coaxial cable 14A to the terminal A of the earphone plug 15 and to the terminal A of the earphone jack 31.

It should be noted that, in the above-mentioned case, the shield of the coaxial cable 14A is connected to the ground of the mobile phone 30 through the terminal J of the earphone plug 15 and the terminal J of the earphone jack 31. Because the high-frequency choke coils L11 and L12 are connected to the codes 12L and the 12R at this moment, the received broadcast wave signal on the cords 12L and 12R will not leak to the terminals E and D of the earphone plug 15. Consequently, the FM broadcast or the terrestrial digital television broadcasting can be received.

Then, audio signals L and R on the left and right channels obtained from this reception of broadcast are supplied to the earphone units 11L and 11R along a signal line, from the terminals E and D of the earphone jack 31 to the terminals E and D of the earphone plug 15 to the high-frequency choke coils L11 and L12 and to the cords 12L and 12R. At this moment, a return path is formed, from the earphone units 11L and 11R to the cords 12L and 12R to the central conductor of the coaxial cable 14A to the terminal A of the earphone plug 15 to the terminal A of the earphone jack 31 to the high-frequency coke coil L35 and to the ground.

When the earphone plug 15 of the monaural earphones 20 is inserted into the earphone jack 31, the FM broadcasting or the terrestrial digital television broadcasting can also be received to allow the user to listen to the received broadcast through the monaural earphones 20.

It should be noted that, if the earphone plug 15 of the stereo earphones 10 is inserted in the earphone jack 31, the terminal C of the earphone jack 31 is grounded through the terminals C and J of the earphone plug 15; if the earphone plug 15 of the monaural earphones 20 is inserted in the earphone jack 31, then the terminal C of the earphone jack 31 is open. Therefore, the DC potential on the terminal C of the earphone jack 31 indicates whether the earphones connected to the earphone jack 31 are the stereo earphones 10 or the monaural earphones 20.

If the earphone plug 15 of the stereo earphones 10 or the monaural earphones 20 is inserted in the earphone jack 31, the terminal F of the earphone jack 31 is grounded through the terminals F and J of the earphone plug 15; if the earphone plug 15 of the stereo earphones 10 or the monaural earphones 20 is not inserted in the earphone jack 31, then the terminal F of the earphone jack 31 is open. Therefore, the DC potential on the terminal F of the earphone jack 31 indicates whether the stereo earphones 10 or the monaural earphones 20 are connected to the earphone jack 31.

As described above, according to the stereo earphones 10 and the monaural earphones 20 shown in FIG. 3, each of the stereo earphones 10 and the monaural earphones 20 can be used also as the antenna for receiving the FM broadcasting and the terrestrial digital television broadcasting.

The related-art documents include the following:
Japanese Patent Laid-open No. 2003-163529;
Japanese Patent Laid-open No. 2004-266434;
Japanese Patent Laid-open No. 2004-274356; and
Japanese Patent Laid-open No. 2005-64742.

SUMMARY OF THE INVENTION

However, because the earphone plug 15 and the earphone jack 31 are configured and standardized as described above, incorporating a circuit for receiving terrestrial digital television broadcasting into the mobile phone 30 tends to lower the reception sensitivity as the antenna.

Figure 5:
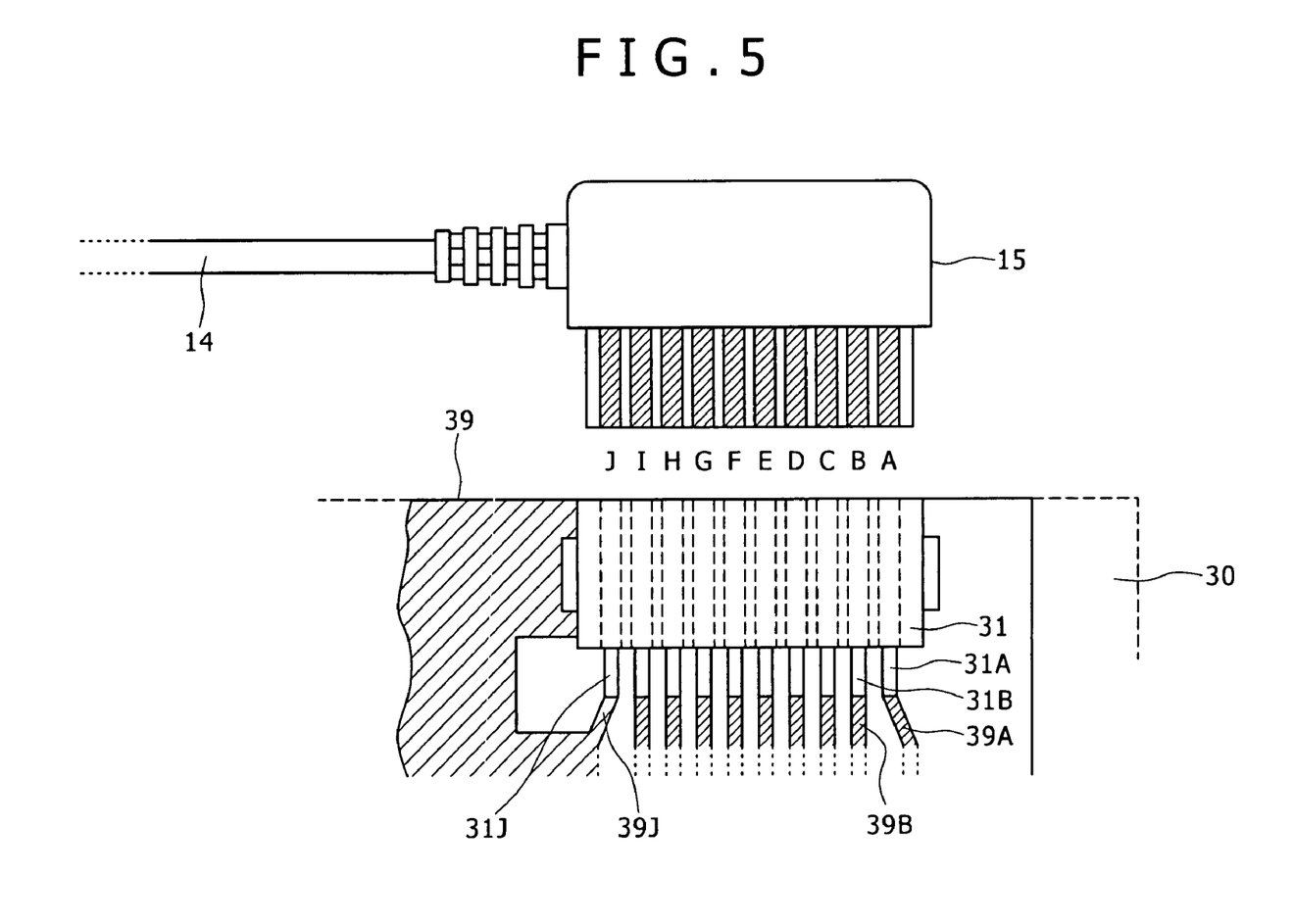
FIG. 5 is an expanded diagram illustrating the earphone plug and the earphone jack.

To be more specific, as shown in FIG. 5, the earphone jack 31 is mounted on a printed circuit board 39 of the mobile phone 30. At this moment, the terminals A through J of the earphone jack 31 are partially extended to be lead patterns 31A through 31J which are soldered to wiring patterns 39A through 39J of the printed circuit board 39, respectively. In this case, the wiring pattern 39J to which the lead pattern 31J of the terminal J is soldered is the ground pattern.

However, the earphone jack 31 is flat in shape and about 10 mm×5 mm in size, so that the lead patterns 31A through 31J of the terminals A through J are very thin. It should be noted that the broadcast wave signal from the coaxial cable 14A is supplied to the terminal A, which is away from the ground terminal J, so that the effect of grounding for the antenna lowers. Further, the terrestrial digital television broadcasting is allocated with a frequency band of 470 MHz to 770 MHz of the UHF band.

Consequently, the terminal J and the lead pattern 31J present an impedance of inductance nature for the broadcast wave signal of terrestrial digital television broadcasting, this impedance giving a transmission loss to the broadcast wave signal, thereby lowering the sensitivity of reception.

In this case, use of the remaining terminals B and G through I for the grounding of the coaxial cable 14A as with the terminal J allows the reduction of the impedance, thereby lowering the transmission loss. However, due to the standards on which the earphone plug 15 and the earphone jack 31 are based, the terminals B and G through I are difficult to be used for arbitrary applications.

Therefore, the present invention addresses the above-identified and other problems associated with related-art methods and apparatuses and solves the addressed problems by providing novel earphones and a novel receiver.

According to an embodiment of the present invention, a receiver makes an earphone cord of an earphone function as an earphone antenna. This receiver has a receiver circuit for receiving a broadcast wave signal received at the earphone code of the earphones and outputting an audio signal; an earphone jack into which a earphone plug is inserted; a first detector circuit for detecting whether the earphones are one of stereo and monaural functionalities; and a second detector circuit for detecting the earphones being connected to the receiver.

The above-mentioned earphone jack has an antenna terminal, left channel audio terminal and right channel audio terminal, a first detection terminal and a second detection terminal, and a ground terminal.

The above-mentioned antenna terminal is connected to an antenna input end of the receiver circuit through a coupling capacitor. The above-mentioned left channel audio terminal and right channel audio terminal are connected to audio output ends of the receiver circuit through a first high-frequency choke coil and a second high-frequency choke coil, respectively.

The above-mentioned first detection terminal and second detection terminal are connected to input ends of the first detector circuit and the second detector F circuit through a third high-frequency choke coil and a fourth high-frequency choke coil. At least one of the first detection terminal and the second detection terminal is connected to ground through a bypass capacitor. The above-mentioned ground terminal is connected to ground. A broadcast wave signal received at the earphone cord is supplied to the receiver circuit through the antenna terminal and the coupling capacitor, and at least one of the first detection terminal and the second detection terminal is grounded in a high-frequency manner through the bypass capacitor.

As described and according to the above-mentioned configuration, the transmission loss for broadcast wave signals received at the earphone antenna can be significantly reduced to minimize the degradation of the reception sensitivity. In addition, the novel configuration can make the transmission loss approximately uniform regardless of frequency, thereby hardly causing a fluctuation in the reception sensitivity. Besides, the novel configuration eliminates the necessity for using otherwise excess terminals of the earphone plug and the earphone jack.

DETAILED DESCRIPTION OF THE PREFERRED EMBODIMENTS

Figure 1:
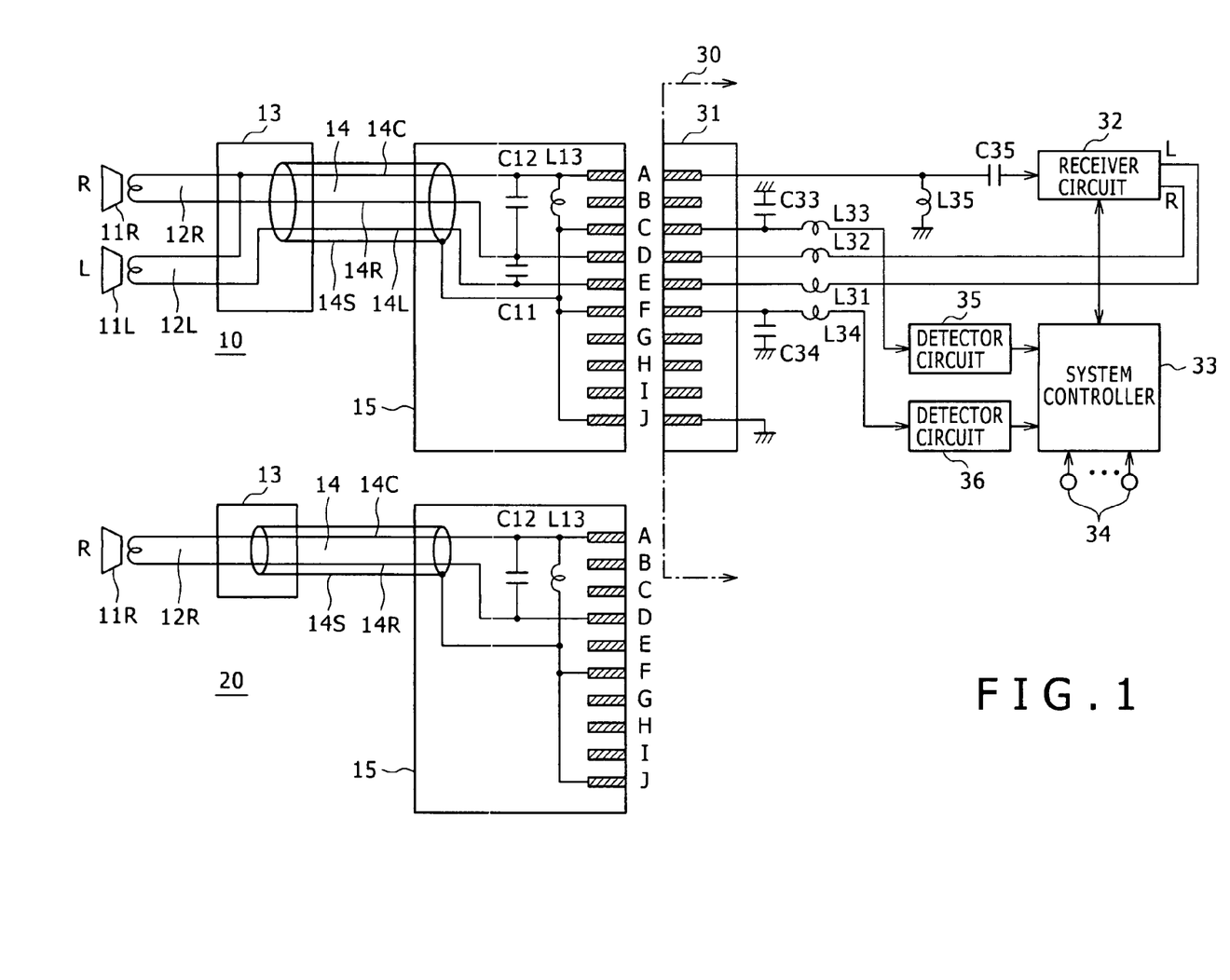
FIG. 1 is a connection diagram illustrating a receiver practiced as one embodiment of the invention.

This invention will be described in further detail by way of embodiments thereof with reference to the accompanying drawings. Now, referring to FIG. 1, there is shown one embodiment of the present invention in which the present invention is applied to a receiver circuit incorporated in a mobile phone. FIG. 1 shows stereo earphones 10 and monaural earphones 20 in a simplified manner as compared with those shown in FIG. 3.

To be more specific, in the stereo earphones 10, a left channel earphone unit 11L and a right channel earphone unit 11R are connected to an intermediate unit 13 with a cord 12L and a cord 12R, and the intermediate unit 13 is connected to an earphone plug 15 with a cable 14.

In this case, the codes 12L and 12R are each a two-core signal conductor. These cords 12L and 12R act as the effective part of the broadcast receiver antenna. The cable 14 has three signal conductors 14C, 14L, and 14R, which are covered with a shield 14S, thereby forming a coaxial cable as a whole. In the intermediate unit 13, one end of the cord 12L is commonly connected with one end of the cord 12R to be connected to one end of the signal conductor 14C. The other end of the cord 12L and the other end of the cord 12R are connected to one end of the signal line 14L and one end of the signal line 14R, respectively.

As described above, the earphone plug 15 has 10 terminals A through J and incorporates coupling capacitors C11 and C12 and a high-frequency coke coil 13 based on a ferrite bead inductor for example. Inside the earphone plug 15, the other ends of the signal conductors 14C, 14R, and 14L are connected the terminals A, D, and E, respectively and the other end of the shield 14S is connected to the terminal J. The capacitor 12C is connected between the terminal A and the terminal D, and the capacitor C11 is connected between the terminal D and the terminal E. The high-frequency choke coil 13 is connected between the terminal A and the terminal C. Further, the terminal F is connected to the terminal J and, because the stereo earphones 10 are for stereo functionality, the terminal C is connected to the terminal J.

The monaural earphones 20 are configured in substantially the same manner as the right channel of the stereo earphones 10. However, in the earphone plug 15 of the monaural earphones 20, although the terminal F and the terminal J are connected with each other, the terminal C and the terminal J are not connected with each other because the monaural earphones 20 are for monaural functionality.

On the other hand, a mobile phone 30 has an earphone jack 31, a receiver circuit 32 for receiving the FM broadcast and the terrestrial digital television broadcasting, and a system controller 33 based on a microcomputer. In this case, the receiver circuit 32 can select a receive band of the FM broadcasting or the terrestrial digital television broadcasting and tune in on a desired broadcast (or a channel) in the selected receive band, under the control of the system controller 33. Then, the receiver circuit 32 outputs stereo or monaural audio signal L, R and, in the case of television broadcasting, displays a video image on a display monitor (not shown) connected to the receiver circuit 32.

In order to achieve the above-mentioned processing, various kinds of data and commands are transferred between the receiver circuit 32 and the system controller 33. Also, the system controller 33 is connected with various operator switches, such as a band selector switch and a tuning switch, for example.

The antenna terminal A of the earphone jack 31 is connected to the antenna input end of the receiver circuit 32 through a coupling capacitor C35 and a high-frequency choke coil L35 is connected between this terminal A and the ground. The audio output ends of the left and right channels of the receiver circuit 32 are connected to the audio terminals E and D of the earphone jack 31 through the high-frequency choke coils L31 and L32, respectively.

Detector circuits 35 and 36 are arranged. The detection terminals C and F of the earphone jack 31 are connected to the input ends of the detector circuits 35 and 36 through the high-frequency choke coils L33 and L34, respectively. The detection outputs are supplied to the system controller 33. Bypass capacitors C33 and C34 are connected between the terminals C and F of the earphone jack 31 and the ground. Further, the terminal J of the earphone jack 31 is connected to the ground. It should be noted that the inputs ends of the detector circuits 35 and 36 are pulled up, not shown.

According to the above-mentioned configuration, if the earphone plug 15 of the stereo earphones 10 is inserted in the earphone jack 31, the terminal C of the earphone jack 31 is grounded through the terminals C and J of the earphone plug 15, so that the DC potential of the terminal C of the earphone jack 31 is "L" (or at logical Low level). However, if the earphone plug 15 of the monaural earphones 20 is inserted in the earphone jack 31, the terminal C of the earphone jack 31 is opened. The DC potential thereof is "H" (or at logic High level).

Then, the DC potential of the terminal C of the earphone jack 31 is detected by detector circuit 35 through the high-frequency coke coil L33. The detection output is supplied to the system controller 33. Therefore, the system controller 33 can know which of the stereo earphones 10 and the monaural earphones 20 are connected to the earphone jack 31. Consequently, the audio signals L and R to be outputted from the receiver circuit 32 can be switched to stereo or monaural.

If the earphone plug 15 of the stereo earphones 10 is inserted in the earphone jack 31, the FM broadcasting and the terrestrial digital television broadcasting are received through the cords 12L and 12R. The received broadcast wave signals are supplied to the receiver circuit 32 along a signal line, from the codes 12L and 12R to the signal conductors 14C, 14L, and 14R to (and capacitors C11 and C12) to the terminal A of the earphone plug 15 to the terminal A of the earphone jack 31 and to the capacitor C35.

The shield 14S of the cable 14 is grounded through a line of the terminal J of the earphone plug 15 and the terminal J of the earphone jack 31, and also through a line of the terminals C and F of the earphone plug 15 to the terminals C and F of the earphone jack 31 and to the capacitors C33 and C34. It should be noted that, because the high-frequency coke coils L31 and L32 are connected to the terminals E and D of the earphone jack 31, respectively, the broadcast wave signals received at the cords 12L and 12R will not leak from the terminals E and D of the earphone jack 31 to the receiver circuit 32.

Consequently, operating an operator switch 34 gets the FM broadcasting or the terrestrial digital television broadcasting selected and a desired channel tuned in. The audio signals L and R of the selected broadcast are outputted from the receiver circuit 32.

These audio signals L and R are supplied to the earphone units 11L and 11R, respectively, along a line of the high-frequency coke coils L32 and L32 to the terminals E and D of the earphone jack 31 to the terminals E and D of the earphone plug 15 to the signal conductors 14L and 14R.

In this case, a line of the earphone units 11L and 11R to the codes 12L and 12R to the signal conductor 14C to the high-frequency choke coil L13 to the terminal J of the earphone plug 15 to the terminal J of the earphone jack 31 to the ground forms a return path. Further, a line of the earphone units 11L and 11R to the codes 12L and 12R to the signal conductor 14C to the terminal A of the earphone plug 15 to the terminal A of the earphone jack 31 to the high-frequency choke coil L35 to the ground forms a return path.

Consequently, the broadcast can be heard in the stereo mode through the stereo earphones 10. At the same time, if the terrestrial digital television broadcasting is being received, the video image thereof is displayed on a display monitor connected to the receiver circuit 32.

On the other hand, if the earphone plug 15 of the monaural earphones 20 is inserted in the earphone jack 31, then a broadcast wave of the FM broadcasting and the terrestrial digital television broadcasting is received at the cord 12R and the received broadcast wave signal is supplied to the receiver circuit 32 along a line of the cord 12R to the signal conductor 14C to the terminal A of the earphone plug 15 to the terminal A of the earphone jack 31 and to the capacitor C35. Consequently, the monaural audio signal of the selected broadcast is outputted from the receiver circuit 32.

Then, this audio signal is supplied to the earphone unit 11R along a line of the high frequency choke coil L32 to the terminal D of the earphone jack 31 to the terminal D of the earphone plug 15 to the signal conductor 14R and to the cord 12R.

At this moment, a line of the earphone unit 11R to the cord 12R to the signal conductor 14C to the high-frequency choke coil L13 to the terminal J of the earphone plug 15 to the terminal J of the earphone jack 31 and to the ground forms a return path. Further, a line of the earphone unit 11R to the cord 12R to the signal conductor 14C to the terminal A of the earphone plug 15 to the terminal A of the earphone jack 31 to the high-frequency choke coil L35 and to the ground also forms a return path.

Consequently, the broadcast can be heard in the monaural mode through the monaural earphones 20. At the same time, if the terrestrial digital television broadcasting is being received, the video image thereof is displayed on a display monitor connected to the receiver circuit 32.

It should be noted that, if the earphone plug 15 of the stereo earphones 10 or the monaural earphones 20 is not inserted in the earphone jack 31, the terminal F of the earphone jack 31 is open, so that the DC potential thereof is "H". In contrast, if the earphone plug 15 is inserted in the earphone jack 31, the terminal F of the earphone jack 31 is grounded through the terminals F and J of the earphone plug 15, so that the DC potential thereof is "L".

This DC potential of the terminal F of the earphone jack 31 is detected by detector circuit 36 through the high-frequency choke coil L34, and the detection output is supplied to the system controller 33. Consequently, the system controller 33 can determine whether or not the earphone plug 15 is inserted in the earphone jack 31.

As described above and according to the stereo earphones 10, the monaural earphones 20, and the mobile phone 30, the FM broadcasting and the terrestrial digital television broadcasting can be heard and viewed by use of the stereo earphones 10 and the monaural earphones 20 each as a receiver antenna.

In this embodiment, the shield 14S of the coaxial cable 14 is ground, in a high-frequency manner, not only along a line of the terminal J of the earphone plug 15 to the terminal J of the earphone jack 31 but also along a line of the terminals C and F of the earphone plug 15 to the terminals C and F of the earphone jack 31 and to the capacitors C33 and C34. Also, the terminal C in the proximity of the terminal A to which broadcast signals are supplied from the coaxial cable 14 is grounded. Consequently, the impedance between the shield 14S of the coaxial cable 14 and the ground gets smaller to lower the transmission loss for broadcast wave signals. In addition, this configuration minimizes the degradation of the reception sensitivity.

Further, the configuration of the mobile phone 30 shown in FIG. 1 allows the related-art stereo earphones 10 and monaural earphones 20 each to be used as an earphone antenna.

Figure 2:
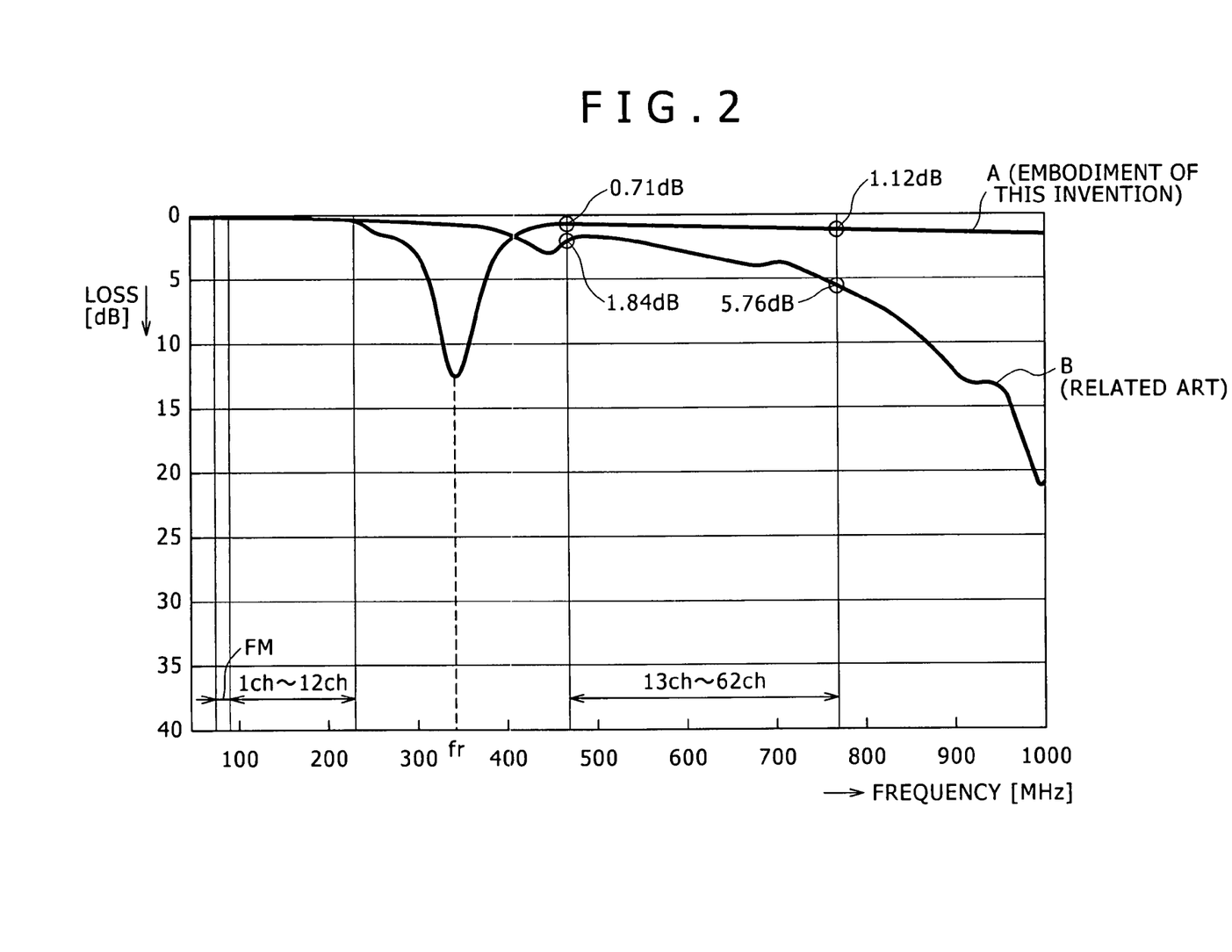
FIG. 2 is a graph indicative of characteristics of measurements.

Referring to FIG. 2, there is shown measurements of the transmission loss (or reception sensitivity) to be obtained when the embodiment of the present invention is applied and not. In the figure, characteristic A is indicative of the case in which the present invention is applied with the capacitances of the capacitors C33 and C34 each set to 10 pF. Characteristic B is indicative of the case in which the embodiment of the present invention is not applied, the capacitors C33 and C34 not connected. It should be noted that the losses at the lower end (470 MHz) of channel 13 and the upper end (770 MHz) of channel 62 are as shown in the figure.

As clearly seen from the shown measurements indicative of a significant reduction in transmission loss, the configuration realized by the embodiment of the present invention can minimize the degradation of the reception sensitivity. In addition, not only the low transmission loss but also the approximate uniformity in transmission loss regardless of frequency will hardly cause a fluctuation in reception sensitivity and allows AGC to be effectively applied. Further, the above-mentioned novel configuration eliminates the necessity for using the terminals B and G through I. Besides, the above-mentioned novel configuration may only connect the capacitors C33 and C34, thereby lowering the number of parts necessary for realizing the embodiments of the invention and making the parts mounting area relatively smaller.

It should be noted that characteristic A has a dip in frequency fr (approximately 334 MHz), which is caused by the resonance between the inductance component between the coaxial cable 14 and the ground of the mobile phone 30 and the capacitors C33 and C34. Therefore, changing the values of the capacitors C33 and C34 allows to change this resonance frequency (or dip frequency) fr.

However, making the values of the capacitors C33 and C34 smaller makes the resonance frequency fr thereof approach the frequency band (channel 13 through channel 62) of the terrestrial digital television broadcasting, thereby lowering the sensitivity on the lower frequency side. In contrast, making the values larger makes the resonance frequency fr approach the frequency band (76 MHz to 90 MHz) of the FM broadcasting, thereby lowering the sensitivity on the high frequency side. The inductance component between the coaxial cable 14 and the ground of the mobile phone 30 also depends on the size (length and width) of the lead wires 31C, 31F, and 31J of the earphone jack 31 and a method of mounting thereof onto a printed circuit board 39, for example.

Consequently, in the reception of the FM broadcasting and the terrestrial digital television broadcasting, the values of the capacitors C33 and C34 may suitably be 5 pF to 30 pF.

As described and according to the above-mentioned circuit configured as described, the transmission loss for broadcast wave signals received at the earphone antenna can be significantly reduced to minimize the degradation of the reception sensitivity. In addition, the novel configuration can make the transmission loss approximately uniform regardless of frequency, thereby hardly causing a fluctuation in the reception sensitivity. Besides, the novel configuration eliminates the necessity for using the terminals B and G through I.

In the above-mentioned novel configuration, a receiver circuit for receiving the FM broadcasting and the terrestrial digital television broadcasting is incorporated in a mobile phone. In the case of receiving the UHF band broadcasting, especially the terrestrial digital television broadcasting, the above-mentioned novel configuration according the present invention may be applied to a dedicated receiver. In this case, the earphone antenna can be used as it is as shown in FIG. 1. Also, in the above-mentioned novel configuration, only one of the high-frequency choke coils L13 and L35 and only one of the capacitors C33 and C34 may be used.

Abbreviations as used herein:
AGC=Automatic Gain Control
FM=Frequency Modulation
UHF=Ultra High Frequency While preferred embodiments of the present invention have been described using specific terms, such description is for illustrative purpose only, and it is to be understood that changes and variations may be made without departing from the spirit or scope of the following claims.

What is claimed is:

1. A receiver for making an earphone cord of an earphone function as an earphone antenna, comprising:
    a receiver circuit for receiving a broadcast wave signal received at said earphone cord of said earphone and outputting an audio signal;
    an earphone jack into which a earphone plug is inserted;
    a first detector circuit for detecting whether said earphone is one of stereo and monaural functionalities; and
    a second detector circuit for detecting said earphone being connected to said receiver;
    said earphone jack having
    an antenna terminal;
    left channel audio terminal and right channel audio terminal;
    a first detection terminal and a second detection terminal; and
    a ground terminal;
    wherein said antenna terminal is connected to an antenna input end of said receiver circuit through a coupling capacitor;
        said left channel audio terminal and said right channel audio terminal are connected to audio output ends of said receiver circuit through a first high-frequency choke coil and a second high-frequency choke coil, respectively;
    said first detection terminal and said second detection terminal are connected to input ends of said first detector circuit and said second detector circuit through a third high-frequency choke coil and a fourth high-frequency choke coil;
    at least one of said first detection terminal and said second detection terminal is connected to ground through a bypass capacitor;
    said ground terminal is connected to ground;
    a broadcast wave signal received at said earphone cord is supplied to said receiver circuit through said antenna terminal and said coupling capacitor; and
    at least one of said first detection terminal and said second detection terminal is grounded in a high-frequency manner through said bypass capacitor.

2. The receiver according to claim 1, wherein said antenna terminal is connected to ground through a fifth high-frequency choke coil.

3. The receiver according to claim 1, wherein said broadcast wave signal is a receive signal of FM (Frequency Modulation) broadcasting and/or terrestrial digital television broadcasting.

4. The receiver according to claims 3, wherein a value of said bypass capacitor is set to a level so as to locate a dip of reception sensitivity between a frequency band of said FM broadcasting and a frequency band of said terrestrial digital television broadcasting.

5. A receiver comprising:
    an earphone plug having
        an antenna terminal,
        a left channel audio terminal and a right channel audio terminal,
        a first detection terminal for detecting whether an earphone is for one of stereo and monaural functionalities,
        a second detection terminal for detecting whether said earphone is connected to said receiver, and
        a ground terminal;
    wherein if said first detection terminal, said second detection terminal, and said ground terminal are interconnected for said earphone having stereo functionality, and said second detection terminal and said ground terminal are interconnected for said earphone having monaural functionality, said earphone functions as an earphone antenna;
    said receiver further comprising:
    a receiver circuit for receiving a broadcast wave signal received at an earphone cord of said earphone and outputting an audio signal;
    an earphone jack into which said earphone plug is inserted; and
    a first detector circuit and a second detector circuit;
    wherein said earphone jack includes, for each of terminals of said earphone plug,
        an antenna terminal,
        a left channel audio terminal and a right channel audio terminal,
        a first detection terminal and a second detection terminal, and
        a ground terminal;
    of said terminals of said earphone jack,
        said antenna terminal is connected to an antenna input end of said receiver circuit through a coupling capacitor,
        said left channel audio terminal and said right channel audio terminal are connected to audio output ends of said receiver circuit through a first high-frequency choke coil and a second high-frequency choke coil,
        said first detection terminal and said second detection terminal are connected to input ends of said first detector circuit and said second detector circuit through a third high-frequency choke coil and a fourth high-frequency choke coil, respectively,
        at least one of said first detection terminal and said second detection terminal is connected to ground through a bypass capacitor,
        said ground terminal is connected to ground,
        a broadcast wave signal received at said earphone cord is supplied to said receiver circuit through said antenna terminal and said coupling capacitor, and
        at least one of said first detection terminal and said second detection terminal is grounded in a high-frequency manner through said bypass capacitor.

* * * * *